United States Patent [19]
Self

[11] Patent Number: 4,586,122
[45] Date of Patent: Apr. 29, 1986

[54] POWER ENHANCER

[75] Inventor: Dolty R. Self, Las Cruces, N. Mex.

[73] Assignee: Enhancement Systems, Inc., Las Cruces, N. Mex.

[21] Appl. No.: 448,688

[22] Filed: Mar. 9, 1983

[51] Int. Cl.⁴ ............................................. H02M 7/06
[52] U.S. Cl. ...................................... 363/126; 363/61
[58] Field of Search .................................... 363/59–61, 363/82, 90, 91, 93, 126

[56] References Cited

U.S. PATENT DOCUMENTS 3,177,421 4/1965 Montgomery ...................... 363/61

FOREIGN PATENT DOCUMENTS 0744872 6/1980 U.S.S.R. ............................... 363/61

Primary Examiner—Peter S. Wong
Attorney, Agent, or Firm—LeBlanc, Nolan, Shur & Nies

[57] ABSTRACT

A device for reducing electrical energy consumption is disclosed. The device is operated by a pulse type voltage source which may be a pulsating direct current or a rectified alternating current. In one embodiment, the device includes primary and secondary cicuits, with first and second diodes employed along with a transformer and a load in the primary circuit and with a large electrolytic capacitor employed in conjunction with the secondary of the transformer and the opposite side of the load in the secondary circuit, with a second capacitor being placed in parallel with the load. The present invention converts the pulsating current into a voltage level between R.M.S. and the peak voltage of the A.C. This causes current to flow acording to the Ohms Law expectation and such current may be utilized by the load.

5 Claims, 7 Drawing Figures

BASIC UNIT

U.S. Patent     Apr. 29, 1986     4,586,122
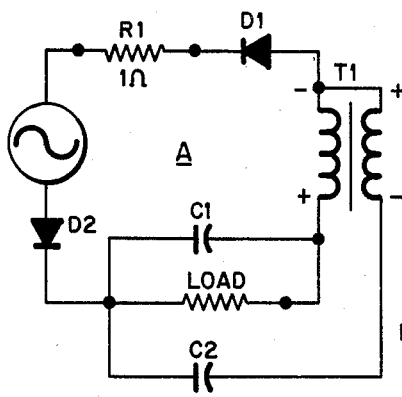
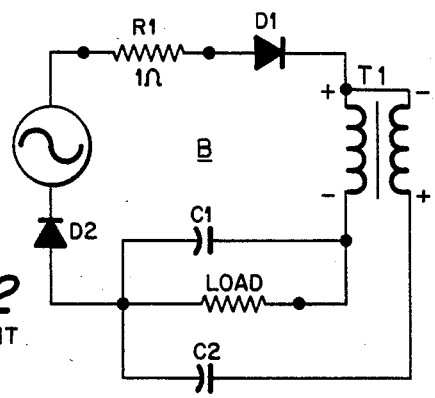
FIG. 1 BASIC UNIT     FIG. 2 BASIC UNIT
FIG. 3     FIG. 4     FIG. 5
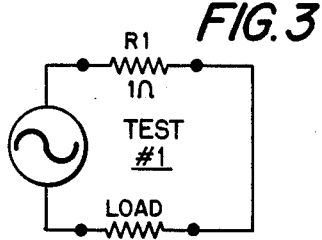
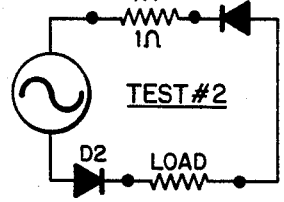
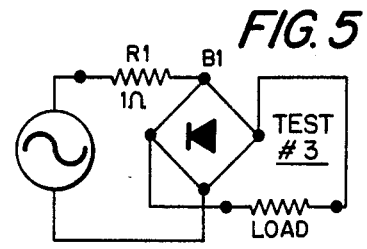
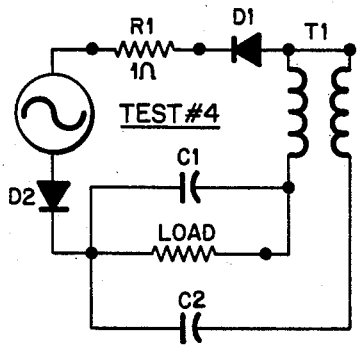
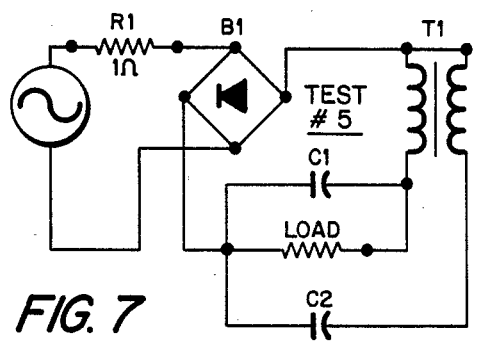
FIG. 6     FIG. 7
| TEST # | CONFIGURATION | R1 1Ω VOLTAGE DROP | LOAD 15Ω VOLTAGE DROP | LOAD TEMP C° | LOAD Ω | LOAD I²R | INPUT VOLTAGE |
|---|---|---|---|---|---|---|---|
| 1 | AC TO LOAD | 2.6 VAC | | 55.1° | 15 | | 50 VAC |
| 2 | HALF WAVE NORMAL | 1.4 VAC | 20.8 VDC | 38.4° | 15 | 29.2 W | 50 VAC |
| 3 | FULL WAVE NORMAL | 2.5 VAC | 40.8 VDC | 52.2° | 15 | 109.3 W | 50 VAC |
| 4 | HALF WAVE WITH ENHANCER | 2.4 VAC | 39.4 VDC | 46.0° | 15 | 101.4 W | 50 VAC |
| 5 | FULL WAVE WITH ENHANCER | 3.3 VAC | 50.6 VDC | 63.5° | 15 | 170.2 W | 50 VAC |
TABLE I

POWER ENHANCER

BACKGROUND AND SUMMARY OF THE INVENTION

The present invention relates to a device known as a power enhancer which will reduce the electrical energy consumption of various devices now in use. By rectifying the alternating current present in most households, the present invention converts this pulsating direct current into a voltage level between R.M.S. and the peak voltage of the A.C. This causes current to flow according to the Ohms Law expectation and such current may be utilized by the load.

BRIEF DESCRIPTION OF THE DRAWINGS

FIGS. 1 and 2 are schematic drawings of basic units of the present invention.

FIGS. 3 through 7 are schematic drawings showing tests of various heating effects on the load, in accordance with the present invention.

DESCRIPTION OF THE PREFERRED EMBODIMENTS

Referring to the drawings, FIGS. 1 and 2 show basic units of the invention with diodes in opposing directions to demonstrate this facet.

FIGS. 3 through 7 show schematic drawings of various tests which were conducted to illustrate the invention. The test conditions were as follows:

Voltage - 50 Volts Alternating Current

Load - 15 Ohms nichrome coiled wire

Temperature - sensor located at fixed distance from the load and reported in degrees Centigrade.

TEST #1 Purpose: to show heating effect of 50 VAC on the load.

TEST #2 Purpose: to show half wave heating effect on the load.

TEST #3 Purpose: to show full wave heating effect on the load.

Tests Nos. 1 through 3 set the standard.

TEST #4 Purpose: to show half wave heating effect using the power enhancer of the invention.

TEST #5 Purpose: to show full wave heating effect using the power enhancer of the invention.

Test results are shown in Table I.

The device of the present invention is operated by a pulse type voltage source. This may be a pulsating direct current or a rectified alternating current.

Looking at basic unit "A" as shown in FIG. 1, one cycle of operation is as follows:

Negative half of rectified sine waves through diode (D1), charges Transformer (T1) primary as indicated and (T1) secondary as indicated which charges capacitor (C2). Diode (D2) is for the purpose of isolation. Capacitor (C1) is charged by negative pulse across the load. Capacitor (C1) acts as a filter. At the end of the pulse the capacitive charges (capacitors) and the inductive charges (transformer) attempt to discharge through the load. At a 60 hertz rate this does not completely happen and the resulting effect is to maintain a voltage level across the load that is greater than the normal R.M.S. voltage but a little less than the peak voltage of the alternating current that originated the pulse. This voltage causes additional current to flow from the source and through the load as per Ohms Law. This cycle is repeated at the frequency of the incoming alternating current.

In positive half wave operation as shown in FIG. 2, capacitor (C1) is charged by a positive pulse. Other aspects of the operation of this embodiment conform to the operation of the embodiment of FIG. 1.

In full wave rectification as shown in FIG. 7, bridge rectifier (B1) charges transformer (T1) primary and secondary, with the secondary acting to charge capacitor (C2). Capacitor (C1) acts as a filter. A voltage level is maintained across the load that is greater than the normal R.M.S. voltage but a little less than the peak voltage of the alternating current that originated the pulse. This voltage causes additional current to flow from the source and through the load as per Ohms law, until the incoming voltage wave form drops below the potenial across the load, at which time the current recycles through the bridge rectifier and then through the load. This continues until the voltage level exceeds the voltage across the load, at which time the capacitor and inductor are recharged and current flows from and back to the source.

With regard to the features of the present invention which are exemplified by the foregoing description, the invention raises AC voltage to a higher level of DC voltage, while the input current and output current are equal to each other, minus small internal losses. In addition, the invention recognizes that current is dependent upon the voltage level but voltage is not dependent upon the current.

Also, it has been previously known for the capacitor to be placed across the load. However, in the present invention, the capacitor C2 is placed across the load and also across the inductive element.

Although the device has been shown in a resistor load application, it is obvious that it could be used in many other applications. While only preferred forms of the invention have been shown and described, other forms of the invention are contemplated and numerous changes and modifications may be made therein without departing from the spirit of the invention as set forth in the appended claims.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A power enhancer device having a primary and a secondary circuit, said device comprising the combination of a pulsating voltage source tied to a first diode means, then to a first primary lead of a transformer, a second primary lead of the transformer being connected to a first side of a load and the load being connected to a second diode means, thus forming the primary circuit; a first secondary lead of the transformer being connected to its reverse polarized primary on an input side and a second secondary lead of the transformer being connected to an electrolytic capacitor that is in turn connected to a second side of the load, thus completing the secondary circuit.

2. The device of claim 1 further including a second capacitor placed in parallel with the load.

3. The device of claim 2 wherein the arrangement of transformer and capacitors maintains an average voltage across the load that is greater than the normal R.M.S. voltage of the source, but less than the peak voltage.

4. The device of claim 1 wherein the current is drawn from the source and through the load as per the Ohms Law expectation of the voltage across the load, making it possible to have an increased current through the load without an increase in source voltage.

5. The device of claim 4 wherein the load is a heating element which is increased to reduce the current to its original level yet have increased power at the element due to the $I^2R$ factor which would be reflected as increased heating effect.

* * * * *